United States Patent Office 2,695,188
Patented Nov. 23, 1954

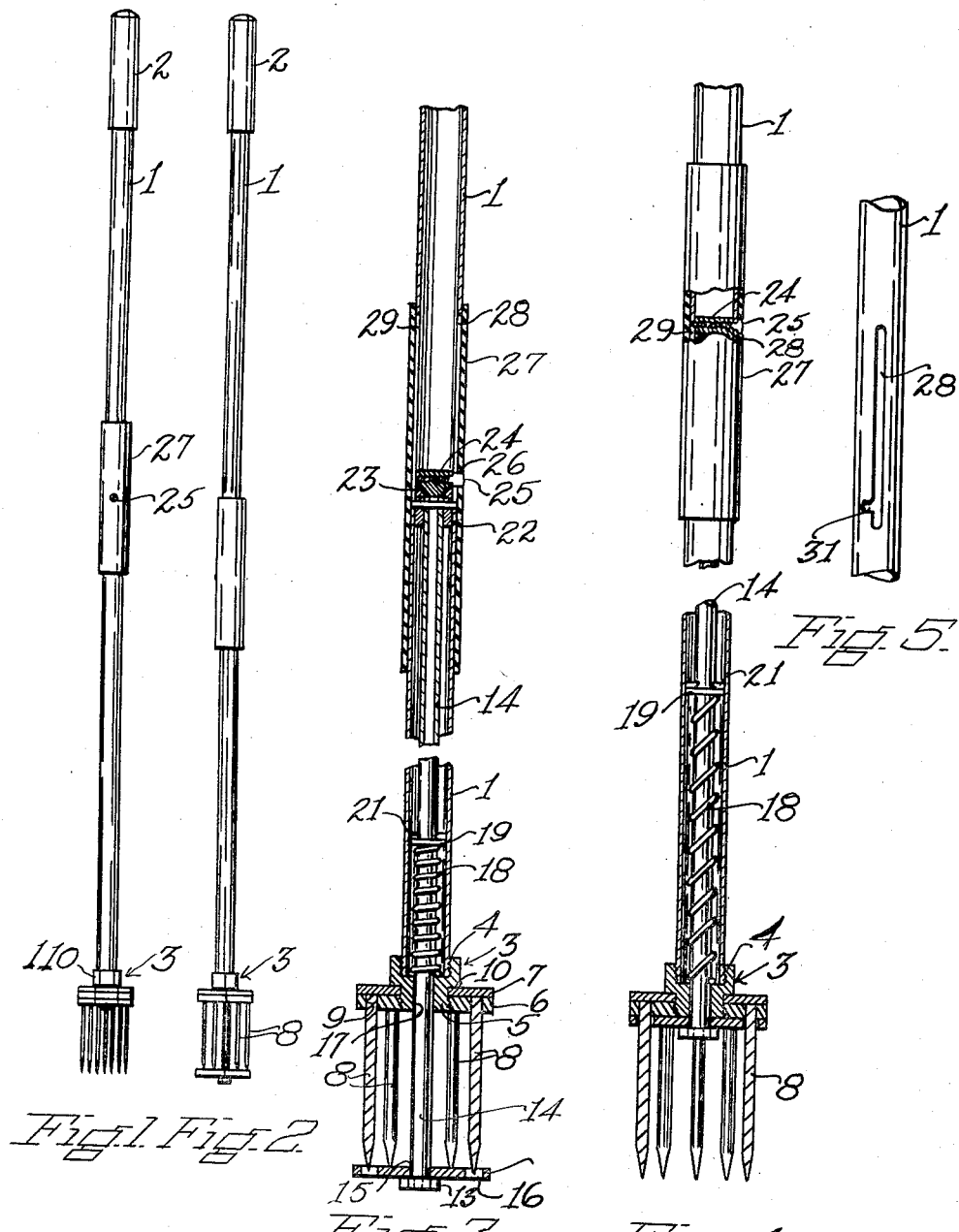

2,695,188

TRASH PICKER

James H. Klausman, Asbury Park, and Wilfred Nutt, Belmar, N. J., assignors to Ernest Schulthess, South Orange, N. J.

Application April 11, 1950, Serial No. 155,305

3 Claims. (Cl. 294—61)

This invention relates to a trash picker or picking instrument, and more particularly to a picker which has a stripping plate which serves to remove accumulated trash from the picker and which, when desired, may easily and conveniently be locked in the forward position as a guard to protect the user and others from injury.

The picker according to this invention may be used by the operator to pick up leaves, trash, litter, debris, etc. without stooping and the spikes or tines thereof may be readily freed of material picked up. When the stripper is in the locked or forward position, the picking instrumentment does not have the usual disadvantages of presenting unguarded sharp tines or spikes. The stripper is manually operated without danger of pinching the operator's hand.

The invention is illustrated by way of example in the accompanying drawing, in which:

Figure 1 is a side elevation of the picker in normal operating position, with stripping plate retracted;

Figure 2 is a side elevation of the picker taken at right angles to Figure 1, showing the stripping plate in guard position;

Figure 3 is a longitudinal cross-section, partly broken away, showing the stripping plate in advanced or guard position;

Figure 4 is a longitudinal fragmentary elevation showing, partly in cross-section, the relationship between the parts when the stripping plate is retracted;

Figure 5 is a fragmentary elevation of the shaft with the manual stripping collar removed, revealing the locking slot for the stripper; and Figure 6 is an end view of the picker shown in Figure 1.

Referring to the drawing, and particularly Figures 1 and 4, the principal structural element of the picking instrument is a main cylindrical hollow shaft 1 surmounted at one end by a fixed cap or handle 2. The cap is preferably closed, for protection of the interior of the picker, and may be fastened to the main shaft or cylinder 1 by a threaded connection, or by riveting, or it may be integral therewith.

Referring to Figure 3, at the other end of the main shaft 1 is a hollow collar 3 internally threaded and connected to the main shaft at 4. The collar has a threaded boss 5 which holds spike plate 6 and backing plate 7. Spikes 8 are affixed in sockets 9 in the spike plate by suitable means, such as swaging, welding, or press fit. The backing plate 7 is held firmly against a shoulder 10 on the collar 3 by the threaded relationship between boss 5 and spike plate 6. The backing plate retains the spikes 8 in proper longitudinal position and when the picker is in use, as when hitting a stone or hard terrain, stops rearward displacement of the spikes. The upper or exposed portion 110 of the collar 3 is preferably in the form of a nut, for easy disassembly and tight assembly of the spike combination. This combination, which comprises the spike plate 6 and spikes 8, can be readily removed as a unit from the picker and sharpened or replaced. A substitute spike combination may be assembled into the picker merely by removing the stripping plate 12 and screwing another spike plate 6, with attached spikes, onto the collar 3. Thus, unlike prior devices for the purpose, the entire device need not be long withdrawn from operation for sharpening or repair or replacement of the spikes. As shown in Figure 6, the stripping plate is polygonal in plan to prevent the picker from rolling when it is lying on an inclined plane. The spike plate 6 and backing plate 7 are similarly shaped and their outlines are in registry with the stripping plate.

As shown in Figures 3 and 4, the stripping plate 12 is fastened by a locking nut 13 to the end of an internal stripping rod 14 which may or may not be hollow, as shown. The stripping rod extends into the region occupied by the spikes 8. No spike is placed in the path of travel of the stripping rod. The exterior tip of the stripping rod 14 may be reduced slightly to provide a shoulder 15 for positive forward and rearward actuation of the stripping plate 12 by sliding the rod 14. Apertures 16 in plate 12 register with the spikes 8. The central cylindrical aperture 17 of collar 3 permits forward and rearward propulsion of the stripping rod 14. A compression spring 18 loosely surrounds the rod 14 within the shaft 1 and is preferably unattached to the rod. The stripping plate 12 is normally retained in the upper or retracted position by the normal expansion tension of the spring 18 between the collar 3 and a disc 19 secured to the rod by any suitable means, here shown as a spring clip 21 fitting a recess in the rod 14. The disc 19 slides evenly within the shaft 1 and prevents lateral displacement of the rod 14.

In the preferred arrangement, the stripping rod 14 extends somewhere near the mid-point of the shaft 1, where it terminates in a guide collar 22 to which it is secured by a pin 23 which is preferably longer than the internal diameter of the shaft. Guide collar 22 is internally threaded to receive a plug 24 which accommodates a set-screw 25 which extends through an aperture 26 in a stripping handle 27. The pin 23 extends into one or more elongated slots 28, 29 (see Figure 5) in shaft 1. The length of slot 28 is approximately equal to the length of the exposed portion of the spikes 8, so that the forward or external propulsion of stripping plate 12 is restricted by the travel of pin 23 in slot 28, thereby positioning the outer surface of plate 12 just beyond the points of the spikes for protection as well as for full stripping action.

The stripping handle 27, in fixed longitudinal relationship with the rod 14 and stripping plate 12, is a cylindrical element easily grasped by the user for stripping the spikes with one hand while holding the picker with the other, normally by the fixed handle 2. The stripping handle is preferably at least twice the length of the slots 28, 29 so that the slots are never exposed after the picker is assembled. Of course, this dimension is not imperative for the stripping handle, but is highly desirable to prevent the operator's finger from getting caught while stripping and also to prevent dirt or other clogging material from getting inside the instrument. The handle 27 preferably fits sufficiently snugly about the shaft 1 to protect the interior from foreign matter, but loosely enough to permit easy propulsion and retraction of the stripping plate.

It will be noted that the slot 28 is provided with a circumferentially extending portion 31 transverse to the axis of the shaft. As the pin 23 travels in slots 28, or 29, or both, the set-screw also rides in slot 28. The threaded relationship between plug 24 and guide collar 22 permits slight circumferential twisting of the plug and hence of the set-screw and stripping handle. The circumferentially extending portion 31 near the forward end of the slot 28 thus receives the set-screw 25 when the stripping handle is in the forward or stripper-ejecting position and is twisted. The compression of the spring (see Figure 3) holds the assembly in the locked safety position until the operator chooses to twist the stripping handle in the opposite direction, whereupon the spring snaps the assembly back into retracted or operating position. There is thus provided simple and convenient means for locking the stripper in the forward or ejecting position by merely twisting the stripping handle circumferentially of the shaft. It will also be noted that the distance between set-screw 25 and pin 23 is about equal to the distance between the circumferentially extending portion 31 and the forward end of slot 28. Thus, in this particular embodiment of the invention, the path of travel of the stripping assembly is restricted in the forward or extended or protective position by the abutment of the pin 23 with the lower end of the slot 28, and at the rear, or retracted or normal operating position by the abutment of the set-screw 25 with the upper end of the slot 28. Therefore, in the preferred embodiment of the invention it is desirable that the distance between the circumferentially extending portion 31 of the slot 28 and the upper end thereof be approximately equal to the length of the exposed portion of the spikes 8. Of course, the set-screw may be replaced by a rivet or another pin, and the guide collar may be constructed so that a single pin may ride in the slot or slots 28, 29.

In view of the many modifications which may be made in accordance with the invention without departing from the principles thereof, it is to be understood that the scope of protection afforded the invention is to be limited only by the appended claims.

What is claimed is:

1. A picker comprising a hollow cylindrical shaft, a plurality of spikes secured at one end of the shaft, a sliding element within said shaft and extending beyond said one end of the shaft, a stripping element secured to said sliding element at the end thereof extending beyond said one end of the shaft, a longitudinal slot in said shaft having a circumferentially extending portion, an operating handle located outside said shaft, a connecting element connecting said operating handle to said sliding element through the slot in said shaft, and resilient means normally urging said connecting element toward one end of said slot, said connecting element being movable circumferentially of said sliding element and shaft into said circumferentially extending portion of said slot.

2. A picker according to claim 1 in which the length of the slot is approximately equal to the length of the spikes.

3. A picker according to claim 2 in which the operating handle is a hollow cylindrical member surrounding said hollow shaft and is equal in length to at least twice the length of the slot.

References Cited in the file of this patent

UNITED STATES PATENTS

| Number | Name | Date |
|---|---|---|
| 51,677 | Allamby et al. | Dec. 26, 1865 |
| 212,505 | Richmond | Feb. 18, 1879 |
| 1,933,314 | Belford | Mar. 5, 1935 |
| 2,500,647 | Schulthess | Mar. 14, 1950 |